United States Patent

Hasebe et al.

[19]
[11] Patent Number: 5,053,292
[45] Date of Patent: Oct. 1, 1991

[54] NICKEL-METAL HYDRIDE SECONDARY CELL

[75] Inventors: Hiroyuki Hasebe; Kazuta Takeno; Yuji Sato; Hiroyuki Takahashi; Hirotaka Hayashida; Kiyoshi Mitsuyasu, all of Yokohama; Ichirou Sawatari, Oomiya, all of Japan

[73] Assignees: Toshiba Battery Co., Ltd., Tokyo; Kabushiki Kaisha Toshiba, Kawasaki, both of Japan

[21] Appl. No.: 584,107

[22] Filed: Sep. 18, 1990

[30] Foreign Application Priority Data

| Sep. 18, 1989 | [JP] | Japan | 1-240068 |
| Sep. 18, 1989 | [JP] | Japan | 1-240069 |
| Sep. 18, 1989 | [JP] | Japan | 1-240071 |
| Oct. 27, 1989 | [JP] | Japan | 1-278710 |
| Mar. 9, 1990 | [JP] | Japan | 2-56699 |
| Mar. 30, 1990 | [JP] | Japan | 2-83925 |

[51] Int. Cl.$^5$ .................. H01M 4/62; H01M 4/70
[52] U.S. Cl. .................. 429/101; 429/217; 429/241
[58] Field of Search .................. 429/101, 217, 241

[56] References Cited

U.S. PATENT DOCUMENTS

| 4,189,533 | 2/1980 | Sugalski | 429/241 X |
| 4,584,249 | 4/1986 | Smithrick | 429/101 X |
| 4,849,312 | 7/1989 | Mitsuyasu et al. | 429/217 |

FOREIGN PATENT DOCUMENTS

54-15141 2/1979 Japan .................. 429/217

*Primary Examiner*—Stephen J. Kalafut
*Attorney, Agent, or Firm*—Oblon, Spivak, McClelland, Maier & Neustadt

[57] ABSTRACT

A nickel-metal hydride secondary cell comprising an enclosure, a non-sinter type nickel positive electrode accommodated in said enclosure and formed of a conductive core and a layer formed on the core and made mainly of a binding medium, nickel hydroxide powder, and cobalt monoxide powder, a hydrogen absorbing alloy negative electrode accommodated in said enclosure and formed of punched metal and a layer formed on the punched metal by applying a paste thereto, said punched metal having a plurality of apertures having a diameter of 1 to 5 mm at an aperture rate of 45 to 70% and having a thickness equal to 10 to 35% of the overall thickness of the negative electrode, and said paste made of 100 parts by weight of hydrogen absorbing alloy powder, 0.005 to 1 part by weight of polyacrylate, 0.01 to 1 part by weight of carboxymethylcellulose, 0.5 to 7 parts by weight of fluoro-resin, and 0.1 to 4 parts by weight of conductive material powder, a separator made of synthetic resin unwoven fabric and located between said positive and negative electrodes, and an alkali electrolyte contained in said enclosure.

6 Claims, 5 Drawing Sheets

NICKEL-METAL HYDRIDE SECONDARY CELL

BACKGROUND OF THE INVENTION

1. Field of the Invention

The present invention relates to a nickel-metal hydride secondary cell and more particularly, to one having an improved hydrogen absorbing negative electrode.

2. Description of the Related Art

As recent electronic technology has been advanced, ensuring lower energy consumption and improved mounting techniques, most electronic components which were unquestionably bulky become cordless and portable. Consequently, various secondary cells which serve as built-in power sources in electronic components have also been required to hold a higher amount of electrical energy. Among them, an alkali secondary cell which has a negative electrode fabricated by forming a powdered hydrogen absorbing alloy on a conductive core which serves as a collector has been developed and widely accepted. As compared with the cadmium negative electrode in a known alkali secondary cell, such a hydrogen absorbing alloy type negative electrode provides a higher rate of energy density in weight or volume, thus ensuring higher energy storage in a cell. In addition, the characteristics of the cell can be improved and will be less assaultable on the environment.

It is known that the hydrogen absorbing alloy negative electrode of the nickel-metal hydride secondary cell is constructed of a non-sinter type by filling a 3-dimensional conductive core, which is made of foamed metal, sintered fiber, or the like and serves as a collector, covered with a powder of hydrogen absorbing alloy and a binding medium. However, the hydrogen absorbing alloy negative electrode which utilizes such a conductive core has less mechanical strength and may be destroyed in the press forming step during production. It is also disadvantageous that the conductive core is so expensive that the production cost of a nickel-metal hydride secondary cell having such a negative electrode increases inordinately.

For the purpose of overcoming the aforementioned disadvantage, a non-sinter type hydrogen absorbing alloy negative electrode is disclosed in U.S. Pat. No. 4,849,312, in which the collector is made of a portion of punched metal having a 2-dimensional structure, which is less expensive to produce than the above 3-dimensional conductive core. Such a hydrogen absorbing alloy negative electrode is composed of a powder produced by mixing, at high speed, a hydrogen absorbing alloy with polyacrylate, polytetrafluoroethylene, and carboxymethylcellulose preparing a paste therefrom, and applying the paste to the portion of punched metal which is in turn dried and pressed into shape.

It is, however, difficult to increase the utilization of the non-sinter type hydrogen absorbing alloy negative electrode as compared with the negative electrode having a 3-dimensional conductive core as a collector, as the former does not allow the nickel-metal hydride secondary cell to provide a significantly higher capacity. Also, during the pressing step in the production of the negative electrode, the collector made of punched metal may be fractured or the dried paste may be partially separated from the punched metal.

SUMMARY OF THE INVENTION

It is an object of the present invention to provide a nickel-metal hydride secondary cell in which the utilization of the hydrogen absorbing alloy negative electrode is improved, thus increasing the storage of the cell.

It is another object of the present invention to provide a nickel-metal hydride secondary cell with increased storage capacity and enhanced reliability by preventing the projection of punched metal for the negative electrode the removal of a paste containing hydrogen absorbing alloy powder during the forming of a non-sinter type nickel positive electrode and a hydrogen absorbing alloy negative electrode separated by a separator into a spiral shape.

It is a further object of the present invention to provide a nickel-metal hydride secondary cell the operative life of which, throughout numerous charge and discharge cycle operations, is much improved.

Specifically, a nickel-metal hydride secondary cell according to the present invention comprises: an enclosure; a non-sinter type nickel positive electrode accommodated in the enclosure and formed of a conductive core and a layer formed on the core and made mainly of a binding medium, nickel hydroxide powder, and cobalt monoxide powder; a hydrogen absorbing alloy negative electrode accommodated in the enclosure and formed of punched metal and a layer formed on the punched metal by applying a paste thereto, the punched metal having a plurality of apertures having a diameter of 1 to 5 mm at an aperture rate of 45 to 70% and having a thickness equal to 10 to 35% of the overall thickness of the negative electrode, and the paste made of 100 parts by weight of hydrogen absorbing alloy powder, 0.005 to 1 part by weight of polyacrylate, 0.01 to 1 part by weight of carboxymethylcellulose, 0.5 to 7 parts by weight of fluoro-resin, and 0.1 to 4 parts by weight of conductive material powder; a separator made of synthetic resin unwoven fabric and located between the positive and negative electrodes; and an alkali electrolyte contained in the enclosure. The term "aperture rate" used here means the ratio of the total opening area of the apertures to the surface area of the punched metal.

The present invention also provides another nickel-metal hydride secondary cell comprising: an enclosure; a non-sinter type nickel positive electrode accommodated in the enclosure and formed of a conductive core and a layer formed on the core and made mainly of a binding medium, nickel hydroxide powder, and cobalt monoxide powder; a hydrogen absorbing alloy negative electrode accommodated in the enclosure and formed of punched metal and a layer formed on the punched metal by applying a paste thereto, the punched metal having a plurality of apertures having a diameter of 1 to 5 mm at an aperture rate of 45 to 70%, and the paste made of hydrogen absorbing alloy powder, a binding medium, and conductive material powder and having a viscosity of 100 to 400 P and a rotational viscosity ratio of 1.5 to 4; a separator made of synthetic resin unwoven fabric and located between the positive and negative electrodes; and an alkali electrolyte contained in the enclosure.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

A nickel-metal hydride secondary cell according to the present invention will be described with reference to FIG. 1.

A non-sinter type nickel positive electrode 1 spaced, by means of a separator 3 made of synthetic resin non-woven material, away from a hydrogen absorbing alloy negative electrode 2, is arranged in spiral form and accommodated within a cylindrical enclosure 4 with its bottom closed. The enclosure 4 also contains an amount of alkali electrolyte. In the upper opening of the enclosure 4, there is provided a circular shaped closing plate 6 having an aperture 5 in the center thereof. Also, an annular insulation gasket 7 is provided between the circumference of the closing plate 6 and the inner upper opening end of the enclosure 4, in which the closing plate 6 is airtightly mounted to the enclosure 4 by sealing with the gasket 7 while radially reducing the upper opening end of the enclosure 4. A positive electrode lead line 8 is coupled at one end to the positive electrode 1 and at the other end to the lower surface of the closing plate 6. Also, a positive electrode terminal 9, having a hat-like shape, is mounted onto the closing plate 6 so as to cover the aperture 5. A rubber safety valve 10 is provided in a space defined by the closing plate 6 and the positive electrode terminal 9 so that the aperture 5 is closed.

The non-sinter type nickel positive electrode 1 is formed by applying a paste consisting of nickel hydroxide, cobalt monoxide (CoO), and a binding medium to a conductive core which serves as a collector. More particularly, the positive electrode 1 is fabricated by mixing nickel hydroxide, cobalt monoxide (CoO), and binding medium with water for preparing a paste and applying the paste to a conductive core which is in turn dried and pressed into shape by e.g. a roller press.

The binding medium in the paste for the positive electrode 1 may be selected from polyacrylate such as sodium polyacrylate or potassium polyacrylate, carboxymethylcellulose (CMC) and a fluoro-resin such as polytetrafluoroethylene (PTFE). Preferably, the binding medium is a composition of polyacrylate, CMC, and a fluoro-resin similar to that of the binding medium in the paste for the negative electrode 2. The binding medium containing the three ingredients is preferably composed of 0.05 to 1 part by weight of polyacrylate, 0.05 to 1 part by weight of CMC, and 0.5 to 5 parts by weight of fluoro-resin corresponding to 100 parts by weight of nickel hydroxide.

The conductive core for the positive electrode 1 may be made of a 2-dimensional metal structure of e.g. punched metal, expanded metal, or net, or a 3-dimensional metal structure of e.g. formed metal or net-shaped metallic fiber.

The hydrogen absorbing alloy negative electrode 2 is formed by applying a paste consisting of 100 parts by weight of hydrogen absorbing alloy powder, 0.005 to 1 part by weight of polyacrylate, 0.01 to 1 part by weight of carboxymethylcellulose (CMC), 0.5 to 7 parts by weight of fluoro-resin, and 0.1 to 4 parts by weight of conductive material powder to a portion of punched metal having an aperture diameter of 1 to 5 mm and an aperture rate of 45 to 70%, in which the thickness of the punched metal is 10 to 35% of the overall thickness of the negative electrode 2. More particularly, the negative electrode 2 is fabricated by mixing hydrogen absorbing alloy powder, polyacrylate, carboxymethylcellulose, fluoro-resin, and conductive material powder with water for preparing a paste, applying the paste to the punched metal which incorporates the arrangement described above and, after removing any surplus of the paste with a scraper, and drying the paste, press forming the punched metal with the use of e.g. a roller press.

The hydrogen absorbing alloy powder contained in the paste for the negative electrode 2 is not particularly specified and may be a material which can absorb hydrogen generated in an electrolyte by electrochemical reaction, and then emit absorbed hydrogen during the discharge and is represented by, for example, the general formula, $XY_{5-a}Z_a$ (where X is a rare earth element, e.g. La, Y is Ni, Z is at least an element selected from Co, Mn, Al, V, Cu, and B, and a is $0=a<2.0$); namely, $LaNi_5$, $MmNi_5$, (Mm: misch-metal), $LmNi_5$ (Lm: Lanthanium-rich misch-metal), and the like in which Ni is partially replaced by Al, Mn, e, Co, Ti, Cu, Zn, Zr, Cr, or B.

The polyacrylate contained in the paste for the negative electrode 2 may be sodium polyacrylate or ammonium polyacrylate. The corresponding amount of the polyacrylate to the hydrogen absorbing alloy powder is predetermined because if the polyacrylate is less then 0.005 part by weight, the dispersion and retention of the hydrogen absorbing alloy powder in the paste declines, thus causing the paste, when dried, to part from the punched metal during press forming so that the negative electrode cannot be completed. Also, if the polyacrylate exceeds 1 part by weight, the dispersion and retention in the paste is less ensured and the coating surface of the paste when applied over the punched metal will not be as smooth as required.

The corresponding amount of the CMC to the hydrogen absorbing alloy powder contained in the paste for the negative electrode 2 must be 0.01 to 1 part of weight for the following reason. If the CMC is less than 0.01 part by weight, it will take a long time to prepare the paste. Further, the powder of the hydrogen-absorbing alloy, which as a great specific gravity will precipitate, inevitably reducing the stability of the paste. If the CMC exceeds 1 part by weight, it will cover the surface of the hydrogen absorbing alloy powder, reducing the negative electrodes ability of oxygen consuming reaction and thus, cause an increase in the inner pressure of the secondary cell.

The fluoro-resin contained in the paste for the negative electrode 2 is turned to a fiber when pressed, for binding the hydrogen absorbing alloy powder. The fluoro-resin may be polytetrafluoroethylene (PTFE) and its corresponding ratio to the hydrogen absorbing alloy powder is specified for the following reason. If the fluoro-resin is less than 0.5 part by weight, its binding power declines, causing the paste, when dried, to part from the punched metal during press forming and thus, the negative electrode cannot be completed. Also, if the fluoro-resin exceeds 7 parts by weight, it will cover the surface of the hydrogen absorbing alloy powder, reducing the oxygen consuming reaction ability of the negative electrode and thus, causing an increase in the inner pressure of the secondary cell.

The conductive material powder in the paste for the negative electrode 2 may be carbon black, graphite, metallic powder, or the like. The corresponding ratio of conductive material powder to hydrogen absorbing alloy powder is specified because if the conductive material powder is less than 0.1 part by weight, the conductivity of the negative electrode declines, lowering the discharge voltage. Also, if the ratio exceeds 4 parts by weight, the concentration of the hydrogen absorbing alloy powder in the phase when dried is reduced, whereby its amount in a given area of the negative electrode will decrease, and the storage capacity of the secondary cell cannot be significantly increased.

Each aperture of the punched metal of the negative electrode 2 must have, as mentioned above, a diameter of 1 mm to 5 mm, for the following reason. If the diameter is less than 1 mm, the paste masses applied to the front and back of the punched metal will fail to bond to each other through the aperture. On the other hand, if the diameter exceeds 5 mm, the punched metal will be distorted and its conductivity reduced inevitably.

The punched metal of the electrode 2 must have, as specified above, an aperture rate ranging from 45% to 70%, for the following reason. If the aperture rate is less than 45%, the electrode 2 will have a void space which is too small to hold a sufficient amount of hydrogen absorbing alloy powder, and the utilization of the electrode 2 will decrease. Also, if the aperture rate is less than 45%, the paste may part from the punched metal when it is dried during the press forming of the negative electrode 2. On the other hand, if the aperture rate exceeds 70%, the physical strength of the punched metal will decrease, which may results in fracture of the electrode 2 during the press forming.

The thickness of the punched metal of the negative electrode 2 is preferably no less than 0.05 mm. If the thickness is less than 0.05 mm, the physical strength of the punched metal is reduced, which may result in a fracture in the press forming during production of the negative electrodes. If the punched metal is excessively thick, the amount of hydrogen absorbing alloy powder in the negative electrode is reduced, thus lowering the capacity of the negative electrode. Hence, the thickness of the punched metal should be not more than 0.15 mm.

The ratio of the thickness of the punched metal to the negative electrode 2 is specified because if the thickness of the punched metal is less than 10% of the overall thickness of the negative electrode 2, the relative volumetric size of the same or a collector to the negative electrode is reduced, lowering not only the collector effect but also the physical strength, which may result in a fracture or distortion during the press forming. If the thickness ratio exceeds 35%, the utilization of the hydrogen absorbing alloy associated with the apertures is reduced, lessening the hydrogen absorbing alloy powder and thus lowering the effectiveness of the negative electrode.

For the arrangement of the positive electrode 1 and the negative electrode 2, separated by the separator 3 in spiral form, which is then placed in the enclosure 4, the punched metal of the negative electrode 2 is preferably shaped in a manner such that the center points of three adjacent apertures are determined so at to constitute an equilateral triangle. Then, the positive electrode 1 and the negative electrode 2, separated by the separator 3, are rolled in the direction parallel to one side of the equilateral triangle on the punched metal.

The hydrogen absorbing alloy negative electrode 2 is also provided in another form by applying a paste which is composed of hydrogen absorbing alloy powder, binding medium, and conductive material powder and has a viscosity of 100 to 400 P and a rotational viscosity ratio of 1.5 to 4, to a portion of punched metal having an aperture diameter of 1 to 5 mm and an aperture rate of 45 to 70%. More particularly, the negative electrode 2 is fabricated by mixing hydrogen absorbing alloy powder, binding medium, and conductive material powder together under the presence of water for preparing a paste which has the same viscosity and rotational viscosity ratio as the above, applying the paste to a punched metal which incorporates the arrangement described above and, after removing any surplus of the paste with a scraper, and drying the paste, press forming the punched metal with the use of e.g. a roller press. During the procedure, the paste having desired values of viscosity and rotational viscosity ratio can also be prepared by controlling the speed and/or time of mixing, as well as the amount of the binding medium and/or the water content.

The binding medium is preferably composed of polyacrylate, CMC, and fluoro-resin such as PTFE; more specifically, 0.005 to 1 part by weight of polyacrylate, 0.01 to 1 part by weight of carboxymethylcellulose, and 0.5 to 7 parts by weight of fluoro-resin corresponding to 100 parts by weight of hydrogen absorbing alloy powder.

The conductive material powder may be carbon black, graphite, metallic powder, or the like. The corresponding amount of conductive material powder to the hydrogen absorbing alloy powder is preferably 0.1 to 4 parts by weight, on the basis of 100 parts by weight of the hydrogen absorbing alloy powder.

The viscosity of the paste is measured under the condition of 6 rpm at 25° C. with the use of a Brookfield type viscometer (a mono-cylindrical viscometer) which has been calibrated using a viscosity reference liquid listed in ASTM. The viscosity should within the range of 100 P to 400 P, as has been specified, for the following reason. If the viscosity is less than 100 P, the paste layer formed on the punched metal is too thin to provide a practically useful negative electrode. If the viscosity is more than 400 P, most of the paste will exfoliate from the punched metal when the excessive portion of the paste applied is scraped off the punched metal.

The rotational viscosity ratio (R) of the paste is then defined by the formula;

$$R = V_1/V_2$$

where $V_1$ and $V_2$ are viscosities measure by means of a Brookfield type viscometer using a reference liquid listed in ASTM, by rotating the viscometer at 6 rpm and 60 rpm, respectively, while maintaining the paste at 25° C.

The rotational viscosity ratio R must be 1.5 to 4, for the following reason. If the ratio R is less than 1.5, the paste becomes insufficiently retentive after applied, making a uniform application on the punched metal impossible. On the other hand, if the ratio R exceeds 4, two undesirable phenomenon will take place. First, it will be difficult to removed an excess of the paste. Second, some components of the paste will likely to part from the others, rendering the paste less stable, if the paste is made to flow during the coating process.

The synthetic resin nonwoven material for the separator 3 may be of polypropylene, polyamide, or a combination of polypropylene and polyamide.

The alkali electrolyte may be a mixture solution of sodium hydroxide (NaOH) and lithium hydroxide (LiOH), of potassium hydroxide (KOH) and LiOH, or of NaOH, KOH, and LiOH. The mixture of KOH and LiOH is most preferred.

Figure 1:
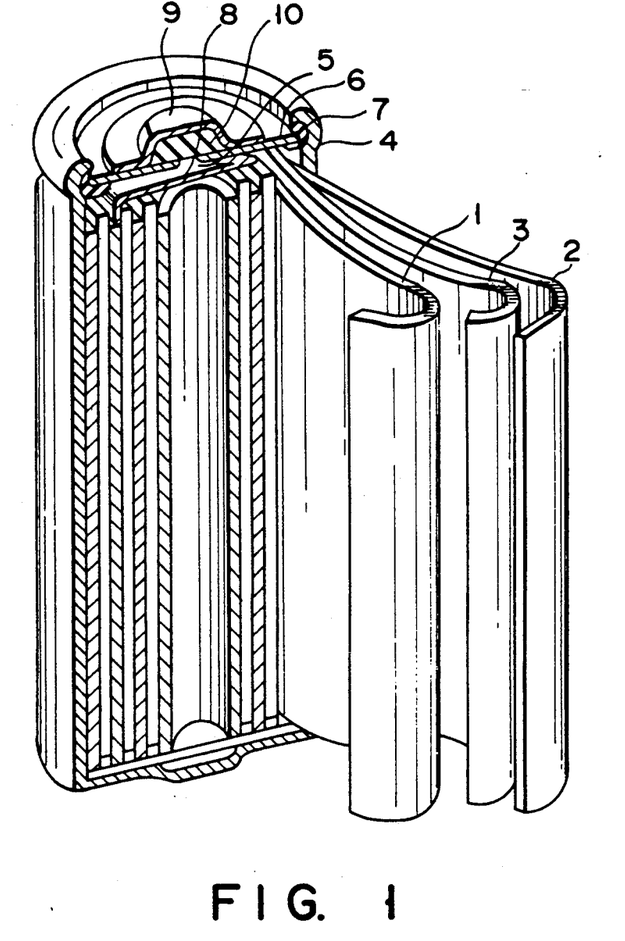
FIG. 1 is a partially explaned perspective view of a nickel-metal hydride secondary cell according to the present invention.

Although the positive electrode 1 and the negative electrode 2 separated by the separator 3 are arranged in a spiral form and placed in the cylindrical enclosure 4 with a bottom, as shown in FIG. 1, they may be provided in layers in which a plurality of positive electrodes and negative electrodes are alternately laminated while being spaced by separators for placement in a enclosure having a bottom.

According to the present invention, a hydrogen absorbing alloy negative electrode is provided by applying a paste consisting of hydrogen absorbing alloy powder, polyacrylate, carboxymethylcellulose, fluoro-resin, and conductive material powder mixed in a given proportion onto a portion of punched metal which serves as a collector, so that the paste containing the hydrogen absorbing alloy powder can be rigidly secured to the punched metal, achieving improvement in the physical strength of the paste and having the surface enhanced during reactivity with hydrogen gas. Also, the punched metal is formed having an aperture diameter of 1 to 5 mm and an aperture rate of 45 to 70%. As a result, an active material, e.g. a hydrogen absorbing alloy powder applied to the punched metal exhibits a higher void rate, encouraging saturation with the alkali electrolyte while containing the hydrogen absorbing alloy powder at higher concentration, so that the utilization of the hydrogen absorbing alloy negative electrode can be increased. The punched metal has improved rigidity and more readily accepts the paste, thus decreasing the risk of fracture and preventing the paste, when dried, from parting therefrom during press forming. The thickness of the punched metal is 10 to 35% of the overall thickness of the negative electrode, offering an adequate mechanical strength and allowing the active material to extend over the punched metal at a higher void rate, thus increasing the contact area with the alkali electrolyte, so that the hydrogen absorbing alloy negative electrode can have increased utilization. Accordingly, a nickel-metal hydride secondary cell in which the hydrogen absorbing alloy negative electrode with improved physical strength and increased utilization is separated by a separator from a non-sinter type nickel positive electrode, all of the above being accommodated in an enclosure which consequently has a higher storage capacity and improved operational reliability.

The rations of the ingredients of the paste forming the positive electrode, including polyacrylate, CMC, fluoro-resin, and binding medium, are similar to the paste for the negative electrode, so that the absorption of the alkali electrolyte can be equal in both the positive electrode and negative electrode, thus allowing the distribution of current to the positive electrode and the negative electrode to be uniform during charge and discharge times. As a result, charging and discharging can be carried out smoothly at both the positive electrode and the negative electrode sides while increase in the inner pressure and decrease in the discharge capacity are prevented. Accordingly, a nickel-metal hydride secondary cell can be provided exhibiting improvement in the operative life for charge and discharge cycle operations.

The punched metal for the hydrogen absorbing alloy negative electrode is arranged in which the center points of three adjacent apertures formed therein are determined constituting an equilateral triangle. Then, the positive electrode and the negative electrode separated by the separator are rolled in the direction parallel to one side of the equilateral triangle on the punched metal, whereby the projection of the punched metal and the removal of the paste at the negative electrode can be prevented. Accordingly, a nickel-metal hydride secondary cell can be provided having a higher storage capacity hence improving the utilization of the negative electrode.

More specifically, when the hydrogen absorbing alloy negative electrode formed by applying a paste to a punched metal is rolled in a spiral form with the positive electrode and the separator, the punched metal acting as a collector is folded along the line which i vertical to the rolling direction and extends across the center points of the apertures. The rolling direction of the negative electrode is determined to be either parallel to one side of the equilateral triangle defined by three adjacent apertures formed in the punched metal or perpendicular to one side of the equilateral triangle. If the direction is parallel to the side of the equilateral triangle, the distance between two folding lines is ½ of the side of the equilateral triangle. If vertical, the distance is $\sqrt{3}/2$ of the side. Accordingly, when the positive electrode and the negative electrode separated by the separator are rolled parallel to the side of the equilateral triangle on the punched metal, the distance between two folding lines becomes shorter, thus allowing the punched metal to be succeedingly folded at more moderate or blunt angles to form a spiral arrangement. The outward projection of portions of the punched metal from the negative electrode and the removal of the hydrogen absorbing alloy can thus be prevented, particularly during the initial stage of a rolling procedure where the folding angle tends to be acute. Hence, a nickel-metal hydride secondary cell will be provided having a higher storage capacity and ensuring higher utilization of the negative electrode.

The paste consisting of hydrogen absorbing alloy powder, binding medium, and conductive material powder, having a given viscosity and exhibiting a specified rotational viscosity ratio is applied to the punched metal specifically determined in the aperture diameter and the aperture rate so that a hydrogen absorbing negative electrode is provided having a uniform layer of paste over the punched metal. More particularly, the hydrogen absorbing alloy negative electrode is formed with rigid physical strength by means of the interrelation between the property of the paste and the arrangement of the apertures in diameter and aperture rate and also, allows the active material on the highly perforating punched metal to come into contact with the alkali electrolyte at a wider area, so that the utilization thereof can be much improved. Hence, a nickel-metal hydride secondary cell having the aforementioned negative electrode and the non-sinter type nickel positive electrode separated by the separator, all of which being placed in an enclosure filed with the alkali electrolyte, will be improved in the operative reliability and increased in the storage capacity.

DETAILED DESCRIPTION OF THE PREFERRED EMBODIMENTS

Preferred embodiments of the present invention will be described referring to the accompanying drawings.

Example 1

A 200-mesh passed powder of hydrogen absorbing alloy was prepared consisting of $LmNi_{4.2}Co_{0.2}Mn_{0.3}Al_{0.3}$ (Lm: La-rich misch metal). Then, 100 parts by weight of the hydrogen absorbing alloy powder was mixed with different mixtures of sodium polyacrylate, CMC, a dispersion (specific weight, 1.5 and solids content, 60% by weight) of polytetrafluoroethylene, carbon black, and deionised water, which are listed in Table 1, for preparing 17 different types of paste. Each paste was applied to punched metal having an aperture diameter of 2.0 mm, an aperture rate of 50%, and a thickness of 0.1 mm which was in turn dried, pressed, and trimmed for fabricating a hydrogen absorbing alloy negative electrode. Each hydrogen absorbing alloy negative electrode was so arranged that 20% of the overall thickness thereof was equal to the thickness of its punched metal.

Both the coating quality of the paste and the physical strength of the negative electrode were examined during production procedure and the results are shown in Table 2.

TABLE 2

|  | Coating quality | Negative electrode physical strength |
| --- | --- | --- |
| No. 1 | Good | Good |
| No. 2 | Good | Good |
| No. 3 | Good | Good |
| No. 4 | Good | Good |
| No. 5 | Good | Good |
| No. 6 | Good | Good |
| No. 7 | Good | Good |
| No. 8 | Good | Good |
| No. 9 | Good | Good |
| No. 10 | Good | Good |
| No. 11 | Good | Good |
| No. 12 | Good | Good |
| No. 13 | Voids appear in coating surface | Removal of paste during roller pressing |
| No. 14 | Coating surface undulates | Distortion of negative electrode during roller pressing |
| No. 15 | Coating surface undulated | Removal of paste during roller pressing |
| No. 16 | Coating surface undulates | Removal of paste during roller pressing |
| No. 17 | Good | Less density after roller pressing |

As apparent from Tables 1 and 2, the hydrogen absorbing alloy negative electrodes (No. 1 to No. 12) according to the present invention exhibit improvement in the paste coating and the physical strength, each being formed by applying a paste of 100 parts by weight of hydrogen absorbing alloy powder, 0.005 to 1 part by weight of sodium polyacrylate, 0.01 to 1 part by weight of CMC, 0.5 to 7 parts by weight of PTFE, and 0.1 to 4 parts by weight of conductive material powder to a punched metal specified in the aperture diameter and the aperture rate for drying and pressing with a roller. On the other hand, the negative electrodes (No. 13 to No. 17) in which at least one of sodium polyacrylate, CMC, PTFE, and conductive material powder was added at a different composition from the aforementioned, are declined in the coating quality and the physical strength.

Example 2

90 parts by weight of nickel hydroxide powder and 10 parts by weight of cobalt monoxide powder were dry mixed with CMC and PTFE and then, added with deionised water for preparing a paste. The paste was

TABLE 1

| | Component of paste (parts by weight) | | | | | |
| --- | --- | --- | --- | --- | --- | --- |
| | Hydrogen absorbing alloy powder | sodium polyacrylate | CMC | PTFE (in solid state) | Carbon black | Water |
| No. 1 | 100 | 0.1 | 0.125 | 1.5 | 1.0 | 40 |
| No. 2 | 100 | 0.5 | 0.125 | 1.5 | 1.0 | 40 |
| No. 3 | 100 | 1.0 | 0.125 | 1.5 | 1.0 | 40 |
| No. 4 | 100 | 0.5 | 0.01 | 1.5 | 1.0 | 40 |
| No. 5 | 100 | 0.5 | 0.05 | 1.5 | 1.0 | 40 |
| No. 6 | 100 | 0.5 | 1.0 | 1.5 | 1.0 | 40 |
| No. 7 | 100 | 0.5 | 0.125 | 1.5 | 1.0 | 40 |
| No. 8 | 100 | 0.5 | 0.125 | 0.5 | 1.0 | 40 |
| No. 9 | 100 | 0.5 | 0.125 | 5.0 | 1.0 | 40 |
| No. 10 | 100 | 0.5 | 0.125 | 7.0 | 1.0 | 40 |
| No. 11 | 100 | 0.5 | 0.125 | 1.5 | 0.5 | 40 |
| No. 12 | 100 | 0.5 | 0.125 | 1.5 | 2.0 | 40 |
| No. 13 | 100 | 0.001 | 0.125 | 1.5 | 1.0 | 40 |
| No. 14 | 100 | 2.0 | 0.125 | 1.5 | 1.0 | 40 |
| No. 15 | 100 | 0.5 | 0.005 | 1.5 | 1.0 | 40 |
| No. 16 | 100 | 0.5 | 0.125 | 0.3 | 1.0 | 40 |
| No. 17 | 100 | 0.5 | 0.125 | 1.5 | 5.0 | 40 | then applied to a nickel sintered fiber core which was in turn dried, pressed, and trimmed for fabricating a non-sinter type nickel positive electrode.

Figure 2:
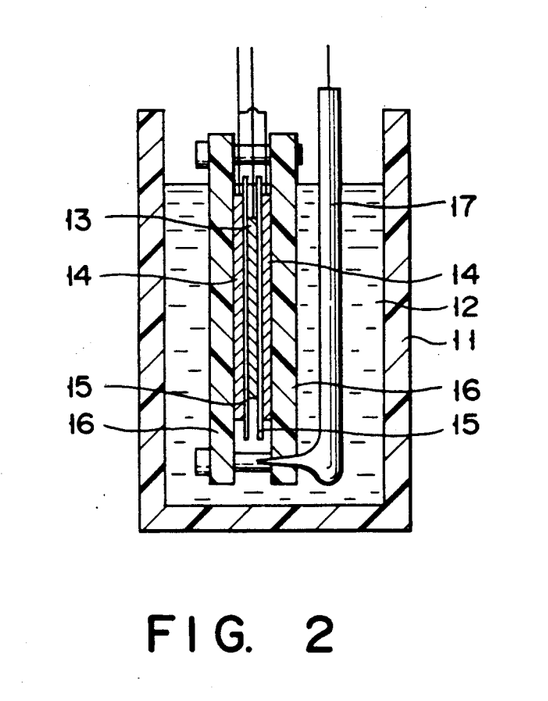
FIG. 2 is a cross sectional view of a test cell employed in examples of the invention.

Six positive electrodes were combined with the No. 2, No. 6, No. 9, No. 12 negative electrodes listed Table 1, thereby forming four test cells having a storage capacity limited to by the negative electrode 900 mAh, and having the structure shown in FIG. 2. As is shown in FIG. 2, each cell has a square enclosure 11 having a bottom and filled with alkali electrolyte 12 made of an 8 N-KOH solution. A hydrogen absorbing alloy negative electrode 13 is sandwiched between a pair of non-sinter type nickel positive electrodes 14 which are separated from each other by separators 15 made of polypropylene unwoven material. The negative electrode 13, the positive electrodes 14, and the separators 15 are located within the enclosure 11. A couple of holder plates 16 made of insulating material are formed on the sides of the electrode 13, tho·· ·  ·· ·he ‚ositive electrodes 14, and those of the separators 15. ·· ·, a reference electrode 17 is located in the enclosure 11.

The test cells were then charged 0.17 Ah at a current of 180 mA in 1 g of hydrogen absorbing alloy and discharged at a current of 180 mA to 0.8 V. This procedure was repeated and a proportion (utilization) of the discharge electricity to the charge electricity was measured. The result indicates that utilization of each test cell is 100%.

Example 3

100 parts by weight of the hydrogen absorbing alloy powder similar to that of Example 1 was mixed with 0.5 parts by weight of sodium polyacrylate, 0.125 parts by weight of CMC, a dispersion (1.5 parts by weight of solid content) of polytetrafluoroethylene, 1.0 part by weight of carbon black, and deionised water for preparing a paste. The paste was applied to 9 punched metal pieces having a thickness of 0.1 mm and an aperture diameter of 2.0 mm which are an aperture rate of 35, 40, 45, 50, 55, 60, 65, 70, and 75%, each being in turn dried, pressed, and trimmed so that 9 different types of hydrogen absorbing alloy negative electrodes were fabricated. All the hydrogen absorbing alloy negative electrodes were the same in the overall thickness and the density of hydrogen absorbing alloy, in which 20% of the overall thickness was equal to the thickness of the punched metal.

The existence of paste removal and punched metal fracture on each hydrogen absorbing alloy negative electrode was examined during a pressing procedure of production and the results are shown in Table 3.

TABLE 3

| | Aperture rate of punched metal (%) | Removal of paste | Fracture of punched metal |
|---|---|---|---|
| No. 1 | 40 | Yes | No |
| No. 2 | 45 | No | No |
| No. 3 | 50 | No | No |
| No. 4 | 55 | No | No |
| No. 5 | 60 | No | No |
| No. 6 | 65 | No | No |
| No. 7 | 70 | No | No |
| No. 8 | 75 | No | Yes |

As apparent from Table 3, the hydrogen absorbing alloy negative electrode (No. 1) exhibit a partial removal of the paste, when dried, from the punched metal having an aperture of rate of 40%. The negative electrode (No. 8) is also found having a fracture portion of the punched metal having an aperture rate of 75% caused during the pressing. On the other hand, the negative electrodes (No. 2 to No. 7) according to the present invention, in which the aperture rate of the punched metal is 45 to 70%, shows no sign of punched metal fracture and exhibits higher characteristics.

Example 4

The negative electrodes of the types No. 1 to No. 7 listed in Table 7 were combined, each with a positive electrode similar to that of Example 2, constituting test cells having the same structure and the same stage capacity as the cell shown in FIG. 2.

The test cells were then charged 0.17 Ah at a current of 180 mA in 1 g of hydrogen absorbing alloy and discharged at a current of 180 mA to 0.8 V. This procedure was repeated and a proportion (utilization) of the discharge electricity to the charge electricity was measured. The resultant measurements are shown in FIG. 3 in the form of a characteristic diagram illustrating the relation between the aperture rate of a punched metal and the utilization of a negative electrode in a test cell.

Figure 3:
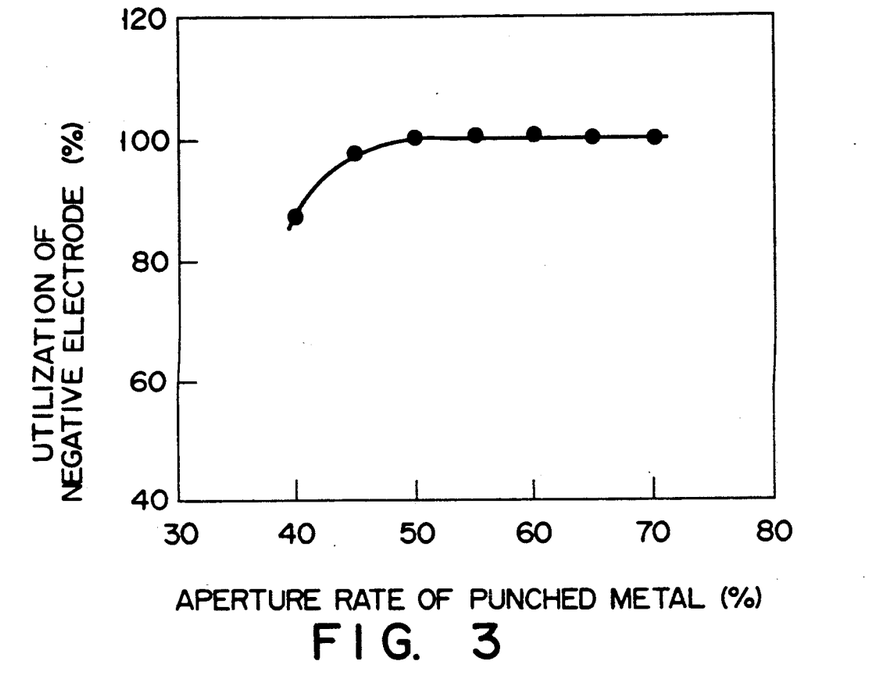
FIG. 3 is a characteristic diagram showing the relation between the aperture rate of a portion of punched metal and the utilization of a negative electrode in a nickel-metal hydride secondary cell associated with Example 4.

As shown in FIG. 3, the utilization of each hydrogen absorbing alloy negative electrode in a test cell associated with a punched metal having an aperture rate of 45 to 70% is almost equal to 100%. In the test cell associated with a punched metal having an aperture rate of 40% the utilization of a negative electrode is about 90%. It is assumed that a decrease in the utilization was caused by less contact of the hydrogen absorbing alloy with the alkali electrolyte resulting from a low void rate of the negative electrode which incorporates punched metal having an aperture rate of less than 45%.

Example 5

100 parts by weight of nickel hydroxide powder was mixed with 10 parts by weight of cobalt monoxide powder, 0.25 parts by weight of sodium polyacrylate, 0.25 parts by weight of CMC, a dispersion (1.5 parts by weight of solid content) of PTFE, and deionised water for preparing a paste. The paste was applied to a nickel sintered fiber core which was in turn dried, pressed, and trimmed for fabricating a non-sinter type nickel positive electrode.

Then, 100 parts by weight of the hydrogen absorbing alloy powder similar to that of Example 1 was mixed and stirred with 0.5 parts by weight of sodium polyacrylate, 0.125 parts by weight of CMC, a dispersion (1.5 parts by weight of solid content) of PTFE, 1 part by weight of carbon black, and deionised water for preparing a paste. The paste was applied to punched metal having a thickness of 0.1 mm, an aperture diameter of 2.0 mm, and an aperture rate of 50% which was in turn dried, pressed, and trimmed for fabricating a hydrogen absorbing alloy negative electrode. The thickness of the punched metal was determined equal to 20% of the overall thickness of the hydrogen absorbing alloy negative electrode.

The positive electrode and the negative electrode, were separated by a separator made of polypropylene unwoven material, arranged in a spiral form and placed in a cylindrical enclosure made of steel having a bottom and filled with an alkali electrolyte consisting of 7 N-KOH and 1 N-LiOH, constituting a nickel-metal hydride secondary cell which provides a nominal storage capacity of 900 mAh and has an arrangement shown in FIG. 1. Control 1

A sinter type nickel positive electrode was combined with the negative electrode made in the same manner as of Example 5, constituting a nickel-metal hydride secondary cell having the same structure and the same nominal storage capacity as the cell shown in FIG. 1.

The nickel-metal hydride secondary cells of Example 5 and Control 1 were then charged at a current of 300 mA for 4.5 hours and discharged at 900 mA until the cell voltage decreased to 1 V. This procedure was repeated and a charge and discharge cycle test was carried out in which a rate of the discharge to the initial charge at each charge and discharge cycle procedure was measured representing the effectiveness of each secondary cell. The resultant measurements are shown in FIG. 4.

Figure 4:
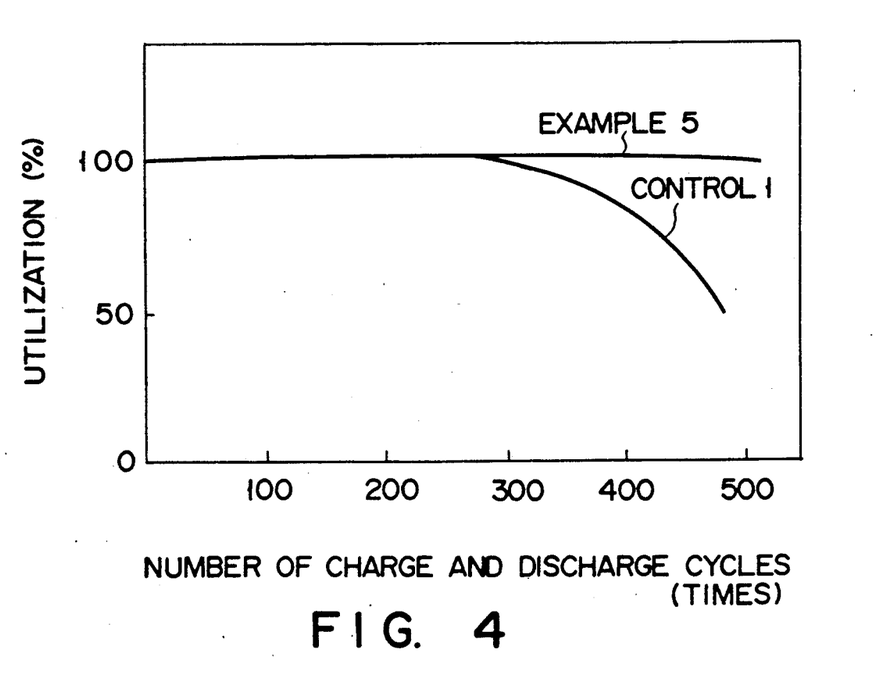
FIG. 4 is a characteristic diagram showing the relation between the number of charge and discharge cycles and the utilization in a nickel-metal hydride secondary cell associated with Example 5 and Control 1.

As shown in FIG. 4, the secondary cell of Example 5 is longer in the operative life for cycle operation than that of Control 1. This is because both the positive electrode and negative electrode of the secondary cell of Example 5 are formed of non-sinter type and contain binding mediums of sodium polyacrylate, CMC, and PTFE so that the speed for absorbing the alkali electrolyte becomes equal for giving improvement in the liquid retention balance and the uniform reaction at the surface of each electrode can be ensure without biases or local activities.

Example 6

100 parts by weight of the hydrogen absorbing alloy powder similar to that of Example 1 was mixed with 0.5 parts by weight of sodium polyacrylate, 0.125 parts by weight of CMC, a dispersion (1.5 parts by weight of solid content) of PTFE, 1 part by weight of carbon black, and deionised water for preparing a paste. Punched metal having a thickness of 0.1 mm, an aperture diameter of 2.0 mm, and an aperture rate of 50% was immersed in the paste contained in an application tub and then, lifted up vertically and a surplus of the paste was removed by a scraper. As the result, a uniform thickness coating of the paste was provided on the periphery of the punched metal. After drying at 80° C., the punched metal was pressed by a roller press and cut into 6 pieces which were then provided as 6 different types of hydrogen absorbing alloy negative electrodes i which the thickness of each punched metal was equal to 5, 10, 20, 30, 40, and 50% of the overall thickness of the negative electrode respectively.

Six negative electrodes were combined, each with positive electrode made in the same manner as of Example 2, constituting test cells having the same structure and the same storage capacity as the cell shown in FIG. 2.

Six test cells were then charged 0.17 Ah at a current of 180 mA in 1 g of hydrogen absorbing alloy and discharged until the cell voltage decreased to 0.8 V. This procedure was repeated and the utilization of each negative electrode relative to a theoretical discharge amount was measured. The resultant measurements are shown in FIG. 5 illustrating the relation between the utilization of an negative electrode and the ratio of punched metal thickness to overall negative electrode thickness.

Figure 5:
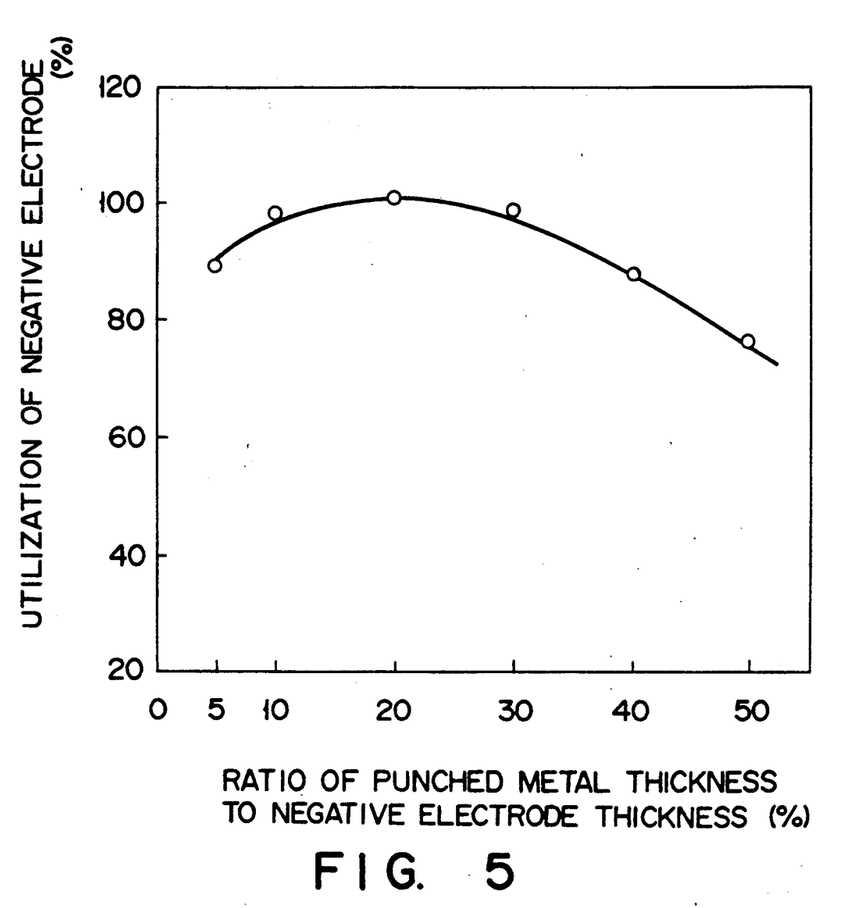
FIG. 5 is a characteristic diagram showing the relation between the ratio of punched metal thickness to negative electrode thickness and the utilization of a negative electrode in a nickel-metal hydride secondary cell associated with Example 6.

As shown in FIG. 5, the utilization of each hydrogen absorbing alloy negative electrode in a test cell in which the thickness of a punched metal is equal to 10 to 35% of the overall thickness is almost equal to 100%. In the secondary cell having punched metal of which thickness is equal to 5, 40, or 50% of the overall thickness of the negative electrode respectively, the utilization of the negative electrode is about 90%. It is assumed that a decrease in the utilization was caused by unsatisfactory collector effect of the punched metal which serves a collector and of which thickness is 5% of the overall thickness. Also, if the thickness of a punched metal is 40 or 50% of the overall thickness, the negative electrode of a test cell is decreased in the aperture rate causing the hydrogen absorbing alloy to come into less contact with the alkali electrolyte.

Example 7

100 parts by weight of the hydrogen absorbing alloy powder similar to that of Example 1 was mixed and stirred with 0.5 parts by weight of sodium polyacrylate, 0.125 parts by weight of CMC, a dispersion (1.5 parts by weight of solid content) of PTFE, 1 part by weight of carbon black, and deionised water for preparing a paste. Punched metal 23 having a thickness 0.1 mm shown in FIG. 6 was provided having a 60° staggered arrangement of apertures 21 of 2.0 mm in diameter, in which the rate of aperture is 50% and the lines 22a, 22b, and 22c extending between the center points of three adjacent apertures 21 constitute an equilateral triangle. The paste was applied to the punched metal 23 which was in turn dried, pressed by a roller press and trimmed for fabricating a hydrogen absorbing alloy negative electrode.

The negative electrode was rolled, together with a positive electrode similar to that of Example 2 separated from the negative electrode by a separator made of polypropylene unwoven material, in the direction (represented by the arrow A shown in FIG. 6) parallel to the line 22a of the equilateral triangle on the punched metal 23 forming a spiral arrangement and placed in a cylindrical enclosure of steel having a bottom and filled with an alkali electrolyte consisting of 7 N-KOH and 1N-LiOH, so that a nickel-metal hydride secondary cell was produced having an arrangement shown in FIG. 1 and providing a nominal storage capacity of 900 mAh.

Control 2

Figure 7:
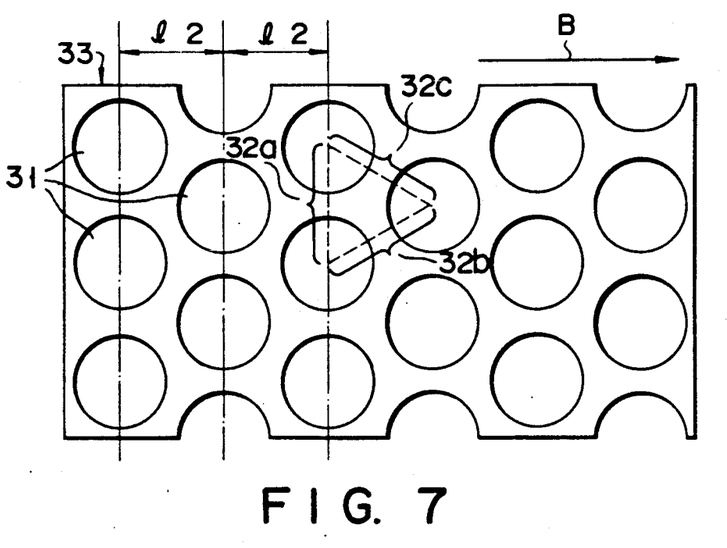
FIG. 7 is a plan view explaining the arrangement of apertures and the spiral direction of the punched metal employed for the negative electrode of Control 2.

Punched metal 33 having a thickness of 0.1 mm shown in FIG. 7 was provided having a 60° staggered arrangement of apertures 31 of 2.0 mm in diameter, in which the rate of aperture is 50% and the lines 32a, 32b, and 32C extending between the center points of three adjacent apertures 31 constitute an equilateral triangle. A paste similar to that of Example 7 was applied to the punched metal 33 which was in turn dried, pressed by a roller press, and trimmed for fabricating a hydrogen absorbing alloy negative electrode.

The negative electrode was rolled, together with a positive electrode made in the same manner as of Example 2 separated from the negative electrode by a separator made of polypropylene unwoven material, in the direction (represented by the arrow B shown in FIG. 7) vertical to the line 32a of the equilateral triangle on the punched metal 33 forming a spiral arrangement and placed in a cylindrical enclosure made of steel having a bottom and filled with an alkali electrolyte consisting of 7 N-KOH and 1N-LiOH, so that a nickel-metal hydride secondary cell which provides a nominal storage capacity of 900 mAh and has an arrangement shown in FIG. 1.

One hundred of the secondary cells of Example 7 and of Control 2 were prepared respectively. Each of the secondary cells was applied between the positive electrode and negative electrode with a DC voltage of 300 V and its insulation resistance was measured for detecting an insulation failure. As the result, the number of insulation failures associated with Example 7 was 1 out of 100. The same associated with Control 2 was 17 out of 100.

Figure 6:
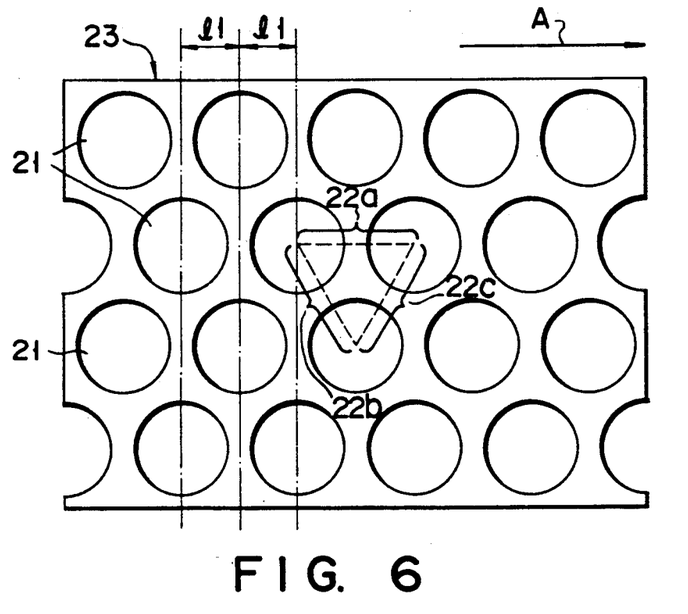
FIG. 6 is a plan view explaining the arrangement of apertures and the spiral direction of the punched metal employed for the negative electrode of Example 7.

Accordingly, it is understood that the secondary cells of Example 7 are much lower in the development of insulation failure than those of Control 2. More specification, when the positive electrode and the negative electrode with the separator interposed in the second-ary cell of Example 7 are rolled, the distance $l_1$ between two folding lines of the punched metal 23 for the negative electrode becomes equal to $\frac{1}{2}$ of the side of the equilateral triangle, as shown in FIG. 6, while the same $l_2$ on the punched metal 33 for the negative electrode of the secondary cell of Control 2 is equal to $\sqrt{3}/2$ of the side of the equilateral triangle as shown in FIG. 7. This means that the negative electrode in the secondary cell of Example 7 is folded at more moderate angles than that of Control 2, whereby every corner of the punched metal can be prevented from projection and the removal of electrode active material can be avoided.

Example 8

Hydrogen absorbing alloy powder similar to that of Example 1 was mixed and stirred with sodium polyacrylate, CMC, PTFE, carbon black, and deionised water for preparing a paste. While the ratio of the ingredients was determined as shown in Table 4, both the time and the speed of stirring were controlled during the mixing procedure so that 6 different types of paste were provided different in the viscosity and the rotational viscosity ratio. The viscosity was measured by a manner (at a temperature of 25° C.) with a Brookfield type viscometer calibrated using a viscosity reference liquid listed in ASTM. A punched metal having a thickness of 0.1 mm, an aperture diameter of 2.0 mm, and an aperture rate of 50% was immersed in each paste contained in an application tub and then, lifted up vertical to the application tub while a surplus of the paste was removed by a scraper. As the result, a uniform thickness coating of the paste was provided on the periphery of the punched metal. After drying at 80° C., the punched metal was pressed by a roller press and cut into 6 pieces which were then provided as 6 different types of hydrogen absorbing alloy negative electrodes. Namely, the thickness of each punched metal was equal to 20% of the overall thickness of the negative electrode.

During the production of the negative electrodes, the coating quality of each paste to the punched metal and the detachability (removability) at the scraper were examined. The results are shown in Table 5.

TABLE 4

|  | Component of paste (parts by weight) | | | | | |
| --- | --- | --- | --- | --- | --- | --- |
|  | Hydrogen absorbing alloy powder | Sodium polyacrylate | CMC | PTFE (in solid state) | Carbon black | Water |
| No. 1 | 100 | 0.1 | 1.5 | 1.5 | 1.0 | 60 |
| No. 2 | 100 | 0.1 | 0.5 | 1.5 | 1.0 | 55 |
| No. 3 | 100 | 0.2 | 0.4 | 1.5 | 1.0 | 50 |
| No. 4 | 100 | 1.5 | 0.2 | 1.5 | 1.0 | 40 |
| No. 5 | 100 | 0.002 | 0.5 | 1.5 | 1.0 | 50 |
| No. 6 | 100 | 2.0 | 2.0 | 1.5 | 1.0 | |

TABLE 5

|  | Viscosity of paste (P) | | Rotational viscosity ratio 6 rpm/60 rpm | Coating quality of paste | Detachability of paste |
| --- | --- | --- | --- | --- | --- |
|  | Number of revolutions 6 rpm | Number of revolutions 60 rpm | | | |
| No. 1 | 80 | 30 | 2.97 | No good | Fairly good |
| No. 2 | 110 | 55 | 2.73 | Good | Good |
| No. 3 | 380 | 120 | 3.17 | Good | Good |
| No. 4 | 490 | 155 | 3.16 | No good | No good |
| No. 5 | 230 | 180 | 1.27 | No good | Fairly good |
| No. 6 | 280 | 55 | 4.73 | Good | No good |

"No good" in the coating quality means the thickness of paste is less than a desired value.
"Fairly good" in the detachability indicates the thickness becomes inconsistent after passing of the slit.
"No good" in the detachability means most of the paste is removed from the punched metal.

As apparent from Table 5, the paste (No. 1) exhibiting a viscosity of less than 100 P at the revolution of 6 rpm in declined in the coating quality on the punched metal enabling no desired negative electrode to be completed. Paste No. 4, which has a viscosity over 400 P at 6 rpm, has but poor coating quality and insufficient detachability, and most of the paste applied to the punched metal will exfoliate from the metal, failing to serve to manufacture a desirable negative electrode. Although exhibiting a viscosity of 100 to 400 P at 6 rpm, paste No. 5, which has a rotational viscosity ratio of less than 1.5, fails to form a layer having a desired thickness. Further, paste No. 6, whose rotational viscosity ratio 4, and most of it applied to the punched metal will exfoliate from the punched metal when dried, and cannot serve to manufacture a mechanical strong negative electrode. Only 2 types of the paste (No. 3 and No. 4) having a viscosity of 100 to 400 P at 6 rpm and a rotational viscosity ratio of 1.5 to 4 can be improved in both the coating quality to the punched metal and the detachability, contributing to the production of improved negative electrodes.

Example 9

The negative electrodes of the types No. 3 and No. 4 listed in Table 5 were combined, each with a positive electrode made in the same manner as of Example 2, constituting test cells having the sam structure and the same storage capacity as the cell shown in FIG. 2.

Two test cells were then charged 0.17 Ah at a current of 180 mA in 1 g of hydrogen absorbing alloy and discharged at a current of 180 mA to 0.8 V. This procedure was repeated and a ratio (utilization) of the discharge amount to the charge amount was measured. As the result, the utilization of each of the test cell is equal to 100%.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A nickel-metal hydride secondary cell comprising:
   an enclosure;
   a non-sinter type nickel positive electrode accommodated in said enclosure and formed of a conductive core and a layer formed on the core and made mainly of a binding medium, nickel hydroxide powder, and cobalt monoxide powder;
   a hydrogen absorbing alloy negative electrode accommodated in said enclosure and formed of punched metal and a layer formed on the punched metal by applying a paste thereto, said punched metal having a plurality of apertures having a diameter of 1 to 5 mm at an aperture rate of 45 to 70% and having a thickness equal to 10 to 35% of the overall thickness of the negative electrode, and said paste made of 100 parts by weight of hydrogen absorbing alloy powder, 0.005 to 1 part by weight of polyacrylate, 0.01 to 1 part by weight of carboxymethylcellulose, 0.5 to 7 parts by weight of fluoro-resin, and 0.1 to 4 parts by weight of conductive material powder;
   a separator made of synthetic resin unwoven fabric and located between said positive and negative electrodes; and
   an alkali electrolyte contained in said enclosure.

2. A secondary cell according to claim 1, wherein said punched metal in said negative electrode is perforated in which the lines extending between the center points of three adjacent apertures constitute an equilateral triangle and both said positive electrode and said negative electrode separated from each other by the separator are rolled in the direction parallel to one side of the equilateral triangle on said punched metal thus forming a spiral arrangement which is in turn accommodated in said enclosure.

3. A secondary cell according to claim 1, wherein said paste for said positive electrode including nickel hydroxide powder and cobalt monoxide powder further contains 0.05 to 1 part by weight of polyacrylate, 0.05 to 1 part by weight of carboxymethylcellulose, and 0.5 to 5 parts by weight of fluoro-resin corresponding to 100 parts by weight of said nickel hydroxide.

4. A nickel-metal hydride secondary cell comprising:
   an enclosure;
   a non-sinter type nickel positive electrode accommodated in said enclosure and formed of a conductive core and a layer formed on the core and made mainly of a binding medium, nickel hydroxide powder, and cobalt monoxide powder;
   a hydrogen absorbing alloy negative electrode accommodated in said enclosure and formed of punched metal and a layer formed on the punched metal by applying a paste thereto, said punched metal having a plurality of apertures having a diameter of 1 to 5 mm at an aperture rate of 45 to 70%, and said paste made of hydrogen absorbing alloy powder, a binding medium, and conductive material powder and having a viscosity of 100 to 400 p and a rotational viscosity ratio of 1.5 to 4;
   a separator made of synthetic resin unwoven fabric and located between said positive and negative electrodes; and
   an alkali electrolyte contained in said enclosure.

5. A secondary cell according to claim 4, wherein said binding medium consists of polyacrylate, carboxymethylcellulose, and fluoro-resin and more particularly, 0.005 to 1 part by weight of polyacrylate, 0.01 to 1 part by weight of carboxymethylcellulose, and 0.5 to 7 parts by weight of fluoro-resin corresponding to 100 parts by weight of said hydrogen absorbing alloy powder.

6. A secondary cell according to claim 4, wherein the amount of said conductive material powder is 0.1 to 4 parts by weight corresponding to 100 parts by weight of said hydrogen absorbing alloy powder.

* * * * *